United States Patent

[11] 3,584,725

[72] Inventors Peter Henry Richards
Kenilworth;
Colin Michael Bennett, Alvechurch,
Birmingham, both of, England
[21] Appl. No. 817,687
[22] Filed Apr. 21, 1969
[45] Patented June 15, 1971
[73] Assignee Pilkington Brothers Limited
Liverpool, England
[32] Priority Apr. 25, 1968
[33] Great Britain
[31] 19708/68

[54] CONVEYOR APPARATUS
11 Claims, 4 Drawing Figs.
[52] U.S. Cl. ............................................. 198/20,
198/179
[51] Int. Cl. ........................................... B65g 47/00
[50] Field of Search ........................................... 198/20,
168, 171, 179, 180; 65/107

[56] References Cited
UNITED STATES PATENTS
842,426 1/1907 Schnelbach .................. 198/179 X 2,888,125 5/1959 Engelson et al ............... 198/20

Primary Examiner—Harvey C. Hornsby
Assistant Examiner—Douglas D. Watts
Attorney—Morrison, Kennedy & Campbell ABSTRACT: A conveyor apparatus, particularly for conveying glass sheets along a horizontal furnace bed, has a run extending alongside the furnace bed and a return run over which elongated carriage members are conveyed longitudinally in succession. The invention provides a transfer device for transferring carriage members between adjacent ends of the two conveyor runs. The transfer device includes at least one driven sprocket wheel and each carriage member has adjacent opposite ends thereof respective guide elements (rollers) locatable between teeth on the sprocket wheel to be engaged thereby. Smooth transfer of the carriage members between the two conveyor runs is effected upon rotation of the sprocket wheel. An arcuate guide member, concentric with the axis of rotation of the sprocket wheel, is arranged to engage the guide elements of a carriage member to prevent disengagement of said elements from the sprocket teeth during transfer of the carriage member over the sprocket wheel.

PATENTED JUN 15 1971

*Inventors*
PETER HENRY RICHARDS and
COLIN MICHAEL BENNETT

By
Morrison, Kennedy & Campbell
*Attorneys*

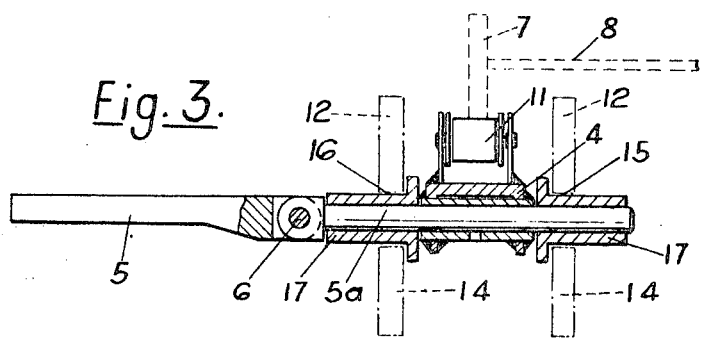

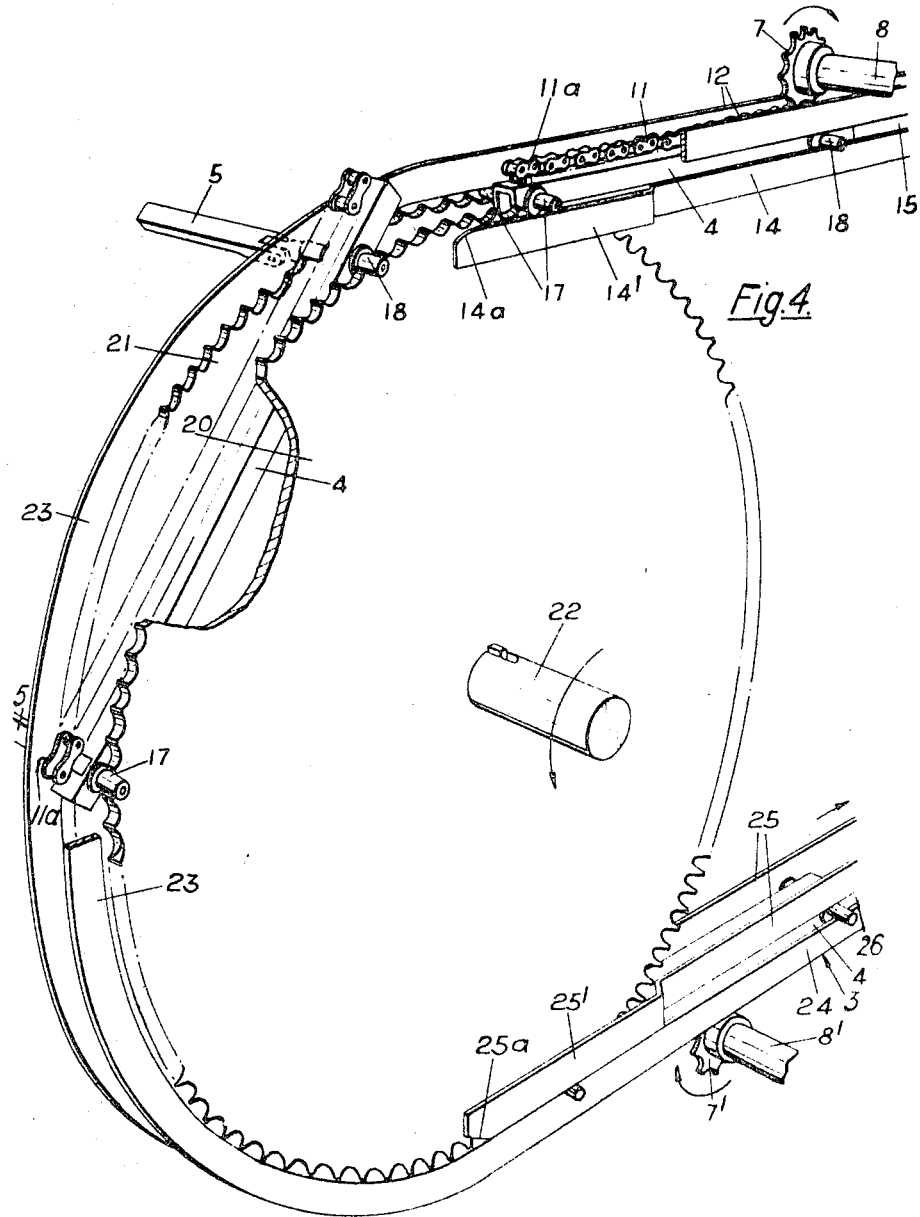

CONVEYOR APPARATUS

BACKGROUND OF THE INVENTION

This invention relates to conveyor apparatus. The invention has particular, but not exclusive, application to the conveying of articles such as glass sheets through a furnace.

When conveying articles through a furnace it is desirable to convey each article by means of separate carriage members. The article may be placed on the carriage member or be propelled by contact with the carriage member. These carriage members can be driven along guide rails to control their movement as they pass from one end of the furnace to the other. However when the carriage members reach the other end of the furnace, it is necessary to find some means of returning them to the start of the conveyor ready for their next passage through the furnace. This can be done by unloading the carriage members and placing them on another conveyor or in a truck ready for return to the other end of the furnace, but this is both time-consuming and laborious.

An object of the present invention is to provide conveyor apparatus having means for transferring carriage members from one conveyor run to another without removal of the carriage members from the conveyor apparatus.

SUMMARY

According to the present invention there is provided a conveyor apparatus having first and second runs, elongated carriage members movable longitudinally along said conveyor runs, and a transfer device effective to transfer carriage members between adjacent ends of the two conveyor runs, said transfer device including at least one driven toothed sprocket wheel and each carriage member having adjacent opposite ends thereof respective guide elements locatable between respective pairs of teeth on the sprocket wheel, whereby smooth transfer of the carriage member between the two conveyor runs is effected by rotation of the sprocket wheel, and further including an arcuate guide member, concentric with the axis of rotation of the sprocket wheel, and arranged to engage said carriage member guide elements, so preventing disengagement of said elements from the sprocket wheel during transfer of the carriage member.

Preferably the conveyor apparatus includes means defining elongated guide slots along each conveyor run, the carriage members being guided along each conveyor run by the location of said guide elements is said guide slots and said guide slots being substantially tangential to the periphery of the sprocket wheel at said adjacent ends of the two conveyor runs. Said guide slot defining means may comprise outer and inner rails, the said arcuate guide member being an effective continuation of the outer rails. Where the two conveyor runs are spaced apart vertically, the outer and inner rails will also be spaced in a vertical plane.

Preferably the inner guide slot-defining rails have respective terminating regions at the sprocket wheel, said terminating regions being shaped to provide transitionary guidance for the carriage guide elements during transfer thereof from the respective guide slot to the sprocket wheel. Said terminating regions preferably have bevelled end faces adapted to engage carriage guide elements and to assist transfer thereof between the guide slots and the transfer device.

In a preferred embodiment a pair of said guide elements, on opposite respective sides of the carriage member, is provided adjacent each end of the carriage member, and the transfer device comprises two parallel spaced apart sprocket wheels rotatable about a common axis and arranged to engage the respective guide elements on opposite sides of each carriage member, the latter being located between the two sprocket wheels when engaged thereby.

Preferably two said elongated guide slots are provided, each being adapted to engage the carriage guide elements on opposite respective sides of the respective carriage members, and respective said arcuate guide members are associated with each sprocket wheel, retaining the carriage guide elements on opposite respective sides of a carriage member which are engaged by the sprocket wheels. Each carriage guide element conveniently comprises a respective roller the axis of which is parallel to the axis of the said sprocket wheel.

Each carriage member is in a preferred construction provided with means defining recesses spaced apart regularly in the direction of travel of the carriage member, and rotary drive wheels are provided at spaced intervals along each conveyor run, said wheels having teeth which engage successively the said recesses to impart translational movement to the carriage member along the respective run. Conveniently, the recess-defining means on each carriage member comprise adjacent rollers of a length of roller chain mounted on the carriage member and extending longitudinally thereof. The length of roller chain may have a leading roller link resilient mounting means being provided for said leading link on the carriage member to facilitate meshing of the roller chain with said drive wheels.

In a preferred application of the invention, the conveyor apparatus is provided in combination with a glass-melting or treating furnace having an elongated horizontal furnace bed, on of the conveyor runs extending alongside said furnace bed and each carriage member being provided with at least one laterally projecting drive transmitting element which engages a respective glass sheet on said furnace bed to convey the sheet along the bed in operation of the conveyor apparatus.

BRIEF DESCRIPTION OF THE DRAWINGS

FIG. 3 is a diagrammatic cross section on the line III–III of FIG. 2, and FIG. 4 is a partly broken-away perspective view of one of the transfer devices in the conveyor apparatus of FIGS. 1 to cl. DESCRIPTION OF THE PREFERRED EMBODIMENT

Figure 1:
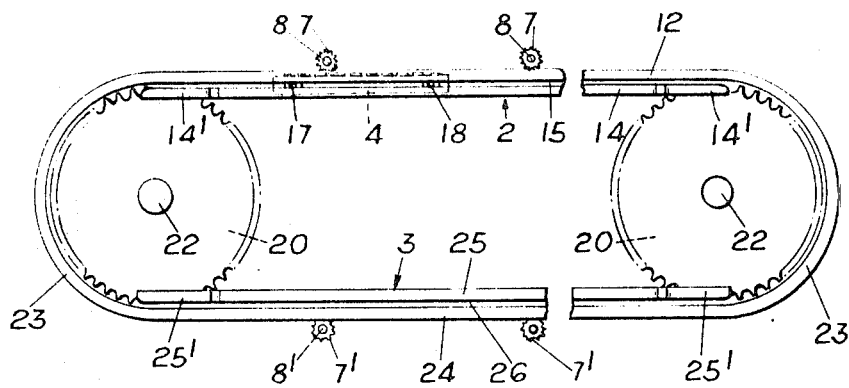
FIG. 1 is, by way of example, a diagrammatic side elevation of conveyor apparatus according to the invention for conveying glass sheets through a furnace.
Figure 2:
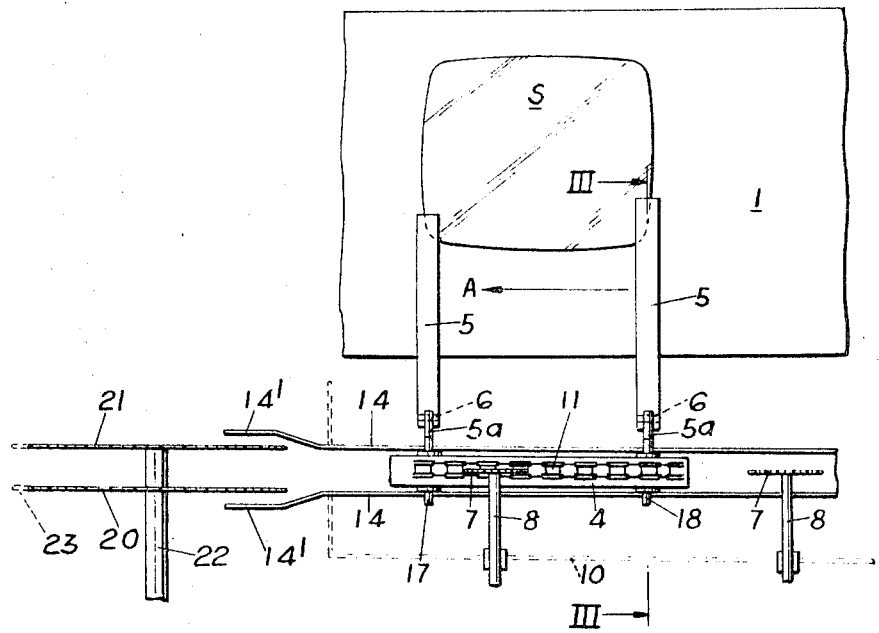
FIG. 2 is a fragmentary plan view from above of the apparatus of FIG. 1.

Figures 1 and 2 show a conveyor apparatus according to the invention for conveying sheets of glass S in continuous succession through a gas hearth furnace for heat treatment. The furnace itself is of conventional construction and has a generally horizontal elongated bed 1 on which sheets of glass S are supported by upwardly directed jets of hot gas (not shown). Thus each glass sheet S is supported in effect by a gaseous cushion, so that surface marking of the sheet during its heating and forming is avoided. The glass sheets S are passed through successive zones of the furnace bed 1, including a heating zone in which each sheet is heated to a temperature at which it is sufficiently supple to effect bending to a requisite shape. After a final bending stage in the heating zone, the sheets S are passed quickly to a cooling or quenching zone where each sheet S is rapidly cooled to effect toughening thereof.

The conveyor apparatus is mounted along one side of the furnace bed 1 and has upper and lower parallel runs, each provided with longitudinally extending upper and lower guides 2, 3 along which a plurality of carriage members 4 are guided for movement in a horizontal direction, indicated by arrow A (FIG. 2), parallel to the bed 1, one carriage member 4 being provided for each glass sheet S. Attached to each carriage member 4 are drive transmitting elements comprising elongated fingers 5, normally two in number, each of which extends laterally toward the furnace bed 1 and engages a respective sheet S at selected points along the adjacent longitudinal edge of the sheet. Each finger 5 is removably attached to the respective carriage member 4, the length of each finger 5, and its position on the carriage member 4, being selected so as to suit the shape of the edge of the respective sheet S and the position of the axis about which the sheet is to be curved. Thus the apparatus may readily accommodate sheets of different shapes and sizes.

Each finger 5 is attached to the respective carriage member 4 by a horizontal hinge 6 for rocking movement in a vertical plane about an axis parallel to the direction of travel of the carriage member 4 (arrow A, FIG. 2), One of the fingers 5 on each carriage member 4 also engages the rear transverse edge of the respective glass sheet S to assist in propelling the sheet along the bed 1.

A plurality of drive wheels 7 are spaced at equal intervals above the upper conveyor run, the drive wheels 7 (two only of which are shown in FIGS. 1 and 2) being rotatable about fixed parallel horizontal axes extending perpendicular to the direction of travel A of the carriage members, and all the drive wheels 7 being disposed in a common vertical plane. The edge of each drive wheel 7 engages respective carriage members 4 successively to drive the carriage members along the upper guide 2 in the direction A, the interval between adjacent drive wheels 7 being less than the length of each carriage member 4. Thus a continuous drive at predetermined speeds is imparted to the carriage members 4. A further set of drive wheels 7', similar to the drive wheels 7, is provided along the lower conveyor run for driving the carriage members 4 in a direction opposite to the arrow A to return the carriage members 4 to the entry ed of the furnace bed 1.

Each drive wheel 7, 7' is driven by respective shafts 8, 8' which extend outwardly through respective holes in the furnace wall 10 (indicated by broken lines). The shafts 8, 8' are driven through respective chain drives by separate driving motors (not shown) or by a common driving motor through appropriate gearing or other drive transmissions.

Each carriage member 4 is an elongated metal bar having an inverted channel section (FIG. 3). The respective fingers 5 are attached by the respective hinges 6 to the extremities of projecting rods 5a which are attached to the carriage member 4 and which extend perpendicular to the longitudinal axis thereof.

A length of roller chain 11 is secured to and extends longitudinally along the upper surface of each carriage member 4, the rollers of the chain 11 being disposed with their axes horizontal. The length of roller chain 11 is attached in such a manner that it forms a longitudinally extending rack of transversely extending cylindrical bars spaced at regular longitudinal intervals on the upper surface of the carriage member 4. The regularly spaced recesses defined between adjacent rollers of the roller chain 11 are engaged by the drive wheels 7, only one of which is shown in FIG. 4. The drive wheels are provided with sprocket teeth on their outer periphery which, upon rotation of the wheels, engage in successive recesses to impart a linear drive to the respective carriage members 4. The leading roller link 11a of each length of roller chain 11 (FIG. 4) has a resilient mounting on the carriage member to facilitate meshing of the drive wheel teeth with the chain 11.

The upper guide 2 consists of two pairs of horizontal outer and inner guide rails 12, 14 spaced apart vertically to define two elongated guide slots 15, 16 on opposite respective sides of the carriage members 4. Each carriage member 4 has two pairs of guide elements comprising flanged guide rollers, 17, 18 adjacent opposite respective ends, the rollers of each pair being on either side of the carriage member 4. The guide rollers 17, 18 conveniently comprise respective collars rotatably mounted on the finger-supporting rods 5a at each end of the carriage member 4 (FIG. 3). The guide rollers 17, 18 are rotatable about horizontal axes perpendicular to the direction of travel A of the carriage member 4 and are located in the respective guide slots 15, 16, the flanges on the rollers 17, 18 engaging the inner surfaces of the guide rails 12, 14 to maintain the carriage 4 centered accurately between the rails 12, 14.

The carriage members 4 are conveyed between the upper and lower guides 2, 3 at each end thereof by respective transfer devices, on of which is shown in FIG. 4. Each transfer device comprised two sprocket wheels 20, 21 spaced apart along the axis of a driven shaft 22 by a distance at least equal to the distance between the outer faces of the flanges on the guide rollers 17, 18. The sprocket wheels 20, 21 are keyed to the shaft 22 and set in position thereon so that the respective sprocket teeth on the wheels 20, 21 are aligned with the guide rollers 17, 18 on opposite sides of the carriage members 4.

The outer pair of guide rails 12 continue beyond each end of the furnace in a straight line until they reach a point tangential to the sprocket wheels 20, 21. From this point each guide rail 12 merges with a respective semicircular guide member 23 concentric with the axis of the shaft 22, and shown partly broken-away in FIG. 4. At a point on the diametrically opposite side of the sprocket wheel, that is, the lowermost point in this example, the guide members 23 merge with an outer pair of guide rails 24 which form part of the lower guide 3. The outer guide rails 24 define with an inner pair of guide rails 25 a lower guide slot 26 extending longitudinally along the lower return run of the conveyor. The inner pairs of guide rails 14 and 25 terminate at each end of the upper and lower conveyor runs respectively, rear points which are tangential to the top and bottom of the sprocket wheels 20, 21.

In order to permit smooth transfer of the flanged guide rollers 17, 18 from the upper guide 2 to the sprocket wheels 20, 21 and from said sprocket wheels to the lower guide 3, the inner guide slot-defining rails, that is, the rails 14 and 25, are provided with outwardly extending sections 14' and 25' which overlap the outer peripheral face of each respective sprocket wheel 20, 21 to provide transitionary support for the carriage guide rollers 17, 18 during transfer thereof between the respective guide slot 15, 26 and the sprocket wheels 20, 21.

In operation, as each carriage member 4 is driven forward by the last drive wheel 7 towards the transfer device, the leading pair of guide rollers 17 engage opposed recesses between sprocket teeth on each side of the respective sprocket wheels 20, 21. The carriage member 4 is then drawn forward and round the sprocket wheels 20, 21 by the rotation of the shaft 22, the semicircular guide members 23 maintaining the engagement of the guide rollers 17 with the sprocket teeth. As the carriage is rotated the trailing pair of guide rollers 18 in turn become engaged in the recesses between further pairs of teeth on the sprocket wheels 20, 21, and the complete carriage member 4 is then engaged with and rotated round the pair of sprocket wheels 20, 21, being located in a position which is tangential to a circle centered on the axis of rotation of the shaft 22.

When the leading pair of guide rollers 17 reach the outwardly extending section 25' of the inner guide rails 25 they are disengaged from the sprocket teeth by the inner pair of guide rails 25, and enter the guide slot 26 between the pairs of guide rails 24, 25. In a similar manner the trailing pair of guide rollers 18 are disengaged from the sprocket teeth and enter the guide slot 26. The outwardly extending sections 14', 25' of the guide rails 14, 25 are provided with respective bevelled end faces 14a, 25a, which engage the guide rollers 17, 18 and assist in guiding the latter into engagement with and disengagement from the sprocket wheels 20, 21 and the guide slots 15, 26 respectively.

Separate finger guide rails (not shown) may be provided for guiding the hinged fingers 5 around the transfer devices between the two conveyor runs.

We claim:

1. Conveyor apparatus having first and second runs, elongated carriage members movable longitudinally along said conveyor runs, each carriage member being provided with means defining recesses spaced apart regularly in the direction of travel of the carriage member, rotary drive wheels at spaced intervals along each conveyor run, said wheels having teeth which engage successively the said recesses to impart translational movement to the carriage member along the respective run, and a transfer device effective to transfer carriage members between adjacent ends of the two conveyor runs, said transfer device including at least one driven toothed sprocket wheel and each carriage member having adjacent opposite ends thereof respective guide elements locatable between respective pairs of teeth on the sprocket wheel, whereby smooth transfer of the carriage member between the two conveyor runs is effected by rotation of the sprocket wheel, and further including an arcuate guide member, concentric with the axis of rotation of the sprocket wheel, and arranged to engage said carriage member guide elements, so preventing disengagement of said elements from the sprocket wheel during transfer of the carriage member.

2. Conveyor apparatus according to claim 1, including means defining elongated guide slots along each conveyor run, the carriage members being guided along each conveyor run by the location of said guide elements in said guide slots and said guide slots being substantially tangential to the periphery of the sprocket wheel at said adjacent ends of the two conveyor runs.

3. Conveyor apparatus according to claim 2, in which said guide slot defining means comprise outer and inner rails, the said arcuate guide member being an effective continuation of the outer rails.

4. Conveyor apparatus according to claim 3, in which the inner guide slot-defining rails have respective terminating regions at the sprocket wheel, said terminating regions being shaped to provide transitionary guidance for the carriage guide elements during transfer thereof from the respective guide slot to the sprocket wheel.

5. Conveyor apparatus according to claim 4, in which the said terminating regions have respective bevelled end faces adapted to engage carriage guide elements and to assist transfer thereof between the guide slots and the transfer device.

6. Conveyor apparatus according to claim 1, in which a pair of said guide elements, on opposite respective sides of the carriage member, is provided adjacent each end of the carriage member, and the transfer device comprises two parallel spaced apart sprocket wheels rotatable about a common axis and arranged to engage the respective guide elements on opposite sides of each carriage member, the latter being located between the two sprocket wheels when engaged thereby.

7. Conveyor apparatus according to claim 6, including means defining elongated guide slots along each conveyor run, the carriage members being guided along each conveyor run by the location of said guide elements in said guide slots and said guide slots being substantially tangential to the periphery of the sprocket wheel at said adjacent ends of the two conveyor runs, and wherein two said elongated guide slots are provided, each being adapted to engage the carriage guide elements on opposite respective sides of the respective carriage members, and respective said arcuate guide members are associated with each sprocket wheel, retaining the carriage guide elements on opposite respective sides of a carriage member which are engaged by the sprocket wheels.

8. Apparatus according to claim 1, in which each carriage guide element comprises a respective roller the axis of which is parallel to the axis of the said sprocket wheel.

9. Conveyor apparatus according to claim 1, in which the recess defining means on each carriage member comprise adjacent rollers of a length of roller chain mounted on the carriage member and extending longitudinally thereof.

10. Conveyor apparatus according to claim 10, wherein the length of roller chain has a leading roller link and resilient mounting means are provided for said leading link on the carriage member to facilitate meshing of the roller chain with said drive wheels.

11. Conveyor apparatus according to claim 1, in combination with a glass-melting or treating furnace having an elongated horizontal furnace bed, one of the conveyor runs extending alongside said furnace bed and each carriage member being provided with at least one laterally projecting drive transmitting element which engages a respective glass sheet on said furnace bed to convey the sheet along the bed in operation of the conveyor apparatus.

UNITED STATES PATENT OFFICE
CERTIFICATE OF CORRECTION

Patent No. 3,584,725      Dated June 15, 1971

Inventor(s) Peter Henry Richards et al

It is certified that error appears in the above-identified patent and that said Letters Patent are hereby corrected as shown below:

Col. 2, line 39 delete "FIGS 1 to" insert --FIGS 1 to 3--.

Col. 2, line 41 delete "cl".

Col. 3, line 23 delete "entry ed" insert --entry end--.

Col. 6, line 22 delete "claim 10" insert --claim 9--.

Signed and sealed this 10th day of April 1973.

(SEAL)
Attest:

EDWARD M. FLETCHER, JR.
Attesting Officer

ROBERT GOTTSCHALK
Commissioner of Patents